US010180918B2

(12) United States Patent
Agrawal et al.

(10) Patent No.: US 10,180,918 B2
(45) Date of Patent: Jan. 15, 2019

(54) MOBILE WIRELESS COMMUNICATION SYSTEM, NETWORK AND METHOD FOR MANAGING THE USE OF A PERIPHERAL IN CONNECTION WITH AN UPCOMING EVENT

(71) Applicant: Motorola Mobility LLC, Chicago, IL (US)

(72) Inventors: Amit Kumar Agrawal, Bangalore (IN); Alberto R. Cavallaro, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/427,305

(22) Filed: Feb. 8, 2017

(65) Prior Publication Data

US 2018/0225229 A1 Aug. 9, 2018

(51) Int. Cl.
*G06F 1/00* (2006.01)
*G06F 13/10* (2006.01)
(Continued)

(52) U.S. Cl.
CPC ........ *G06F 13/102* (2013.01); *G06F 9/44505* (2013.01); *G06F 13/126* (2013.01);
(Continued)

(58) Field of Classification Search
USPC ......................................... 710/72–74, 15–19
See application file for complete search history.

(56) References Cited

U.S. PATENT DOCUMENTS 7,330,913 B1 * 2/2008 Dahneke ............... G06F 9/4411
710/14
8,578,062 B2 * 11/2013 Matton ................. G06F 9/4411
710/19
(Continued)

OTHER PUBLICATIONS

Satyabrata Rout, et al., "Systems and Methods for Context-Based File Sharing", U.S. Appl. No. 15/154,452, filed May 13, 2016.
(Continued)

*Primary Examiner* — Raymond N Phan
(74) *Attorney, Agent, or Firm* — Lawrence J. Chapa

(57) ABSTRACT

The present invention provides a mobile wireless communication system, network, and method for managing the use of one or more peripherals with a mobile wireless communication device in connection with an upcoming event. The method includes associating one or more peripherals with one or more users, where the one or more peripherals have an extended capability for use with a mobile wireless communication device, and maintaining a list of the peripheral associations and the respective extended capabilities. Upcoming events and any need for corresponding event supporting capabilities are monitored. Any unmet need for event supporting capabilities is compared with the extended capability of peripherals associated with at least some of the one or more users that will be attending the upcoming event. An indication is provided to at least one of the users that will be attending the upcoming event having an associated peripheral that will address the unmet need for event supporting capabilities of a request to bring the associated peripheral of the at least one of the users to the upcoming event for providing the associated extended capability for use with a mobile wireless communication device.

20 Claims, 9 Drawing Sheets

(51) Int. Cl.
*G06F 9/445* (2018.01)
*G06F 13/40* (2006.01)
*G06F 13/38* (2006.01)
*G06F 13/12* (2006.01)
*H04W 88/06* (2009.01)
*H04W 4/02* (2018.01)

(52) U.S. Cl.
CPC ........ *G06F 13/385* (2013.01); *G06F 13/4068* (2013.01); *H04W 4/02* (2013.01); *H04W 88/06* (2013.01)

(56) References Cited

U.S. PATENT DOCUMENTS

| | | | |
|---|---|---|---|
| 9,445,224 B2* | 9/2016 | Cavallaro | H04W 24/08 |
| 2007/0245039 A1* | 10/2007 | Dahneke | G06F 9/4411 |
| | | | 710/15 |
| 2012/0011285 A1* | 1/2012 | Matton | G06F 9/4411 |
| | | | 710/8 |
| 2012/0309388 A1* | 12/2012 | Moosavi | H04W 52/0254 |
| | | | 455/426.1 |

OTHER PUBLICATIONS

Alberto Cavallaro, et al., "Identifying At Least One Alternative Power Source for Providing Power to a Portable Electronic Device", U.S. Appl. No. 15/221,322, filed Jul. 27, 2016.

Ingrid Burbey, et al., "When Will You Be at the Office? Predicting Future Location Times", Institute for Computer Sciences, Social Informatics and Telecommunications Engineering, MOBICASE 2010, LNICST 76, pp. 156-175, 2012.

Minal S. Manure, "Place Reminder—An Android App", International Journal of Computer Science and Mobile Computing, vol. 4, Issue 1, pp. 192-200, Jan. 2015.

"Managing Resource Mailboxes", Intermedia Knowledge Base, Article ID: 1439, Jul. 13, 2015.

* cited by examiner

MOBILE WIRELESS COMMUNICATION SYSTEM, NETWORK AND METHOD FOR MANAGING THE USE OF A PERIPHERAL IN CONNECTION WITH AN UPCOMING EVENT

FIELD OF THE INVENTION

The present invention relates generally to managing the use of a peripheral with a mobile wireless communication device, and more particularly, to managing the use of the peripheral relative to an upcoming event.

BACKGROUND OF THE INVENTION

During the recent past, cellular telephones have transitioned from communication devices dedicated to making a wireless voice call, to multifunction devices capable of voice communications, data communications and web access. Cellular communication devices have generally become increasingly more capable, with the newer devices generally continuing to incorporate more and more functionality. However, it is not always practical to incorporate every possible feature into a device, that one or more of its many users may find beneficial to include and have be present in the device. This can be the case, where use of the feature may be infrequent, and/or the space requirements in connection with the additional features, when considered in connection to the frequency of use, do not justify a permanent presence in the device.

In some instances, a particular feature can be supported through the use of a peripheral, which can be coupled to the main device as needed. By being implemented as a peripheral, as opposed to a separate stand alone device, one can leverage the processing, storage and communication capabilities of the main device, so as to more selectively implement the additional features into the device, while still leveraging the synergistic benefits associated with including the additional features into the main device.

Incorporating the feature into a peripheral, allows those users that want to make use of the particular feature to be able to choose to acquire the peripheral. Furthermore, the peripheral and features which they support could then be separated from and correspondingly selectively coupled to the device, so as to correspond to the instances in which the features they support are needed or desired. In at least some instances, examples of features that one or more peripherals can have include extended image capture, audio projection, and/or image projection capabilities. However, because the peripherals may be seldom used, the user may not be in a habit of having the peripherals always being immediately available. Further, because the peripherals are seldom used and correspondingly are frequently purposefully left behind, even in instances where it would be beneficial and/or desirable to have them, the peripherals may be forgotten and/or unavailable.

The present inventors have recognized that by monitoring anticipated upcoming events, it may be possible to predict a corresponding need for the extended capabilities of a peripheral, which would allow a system and method for managing the use of one or more peripherals with a mobile wireless communication device to provide an indication to a user, when it may be beneficial for the user to have their peripheral available for use with a wireless communication device at an upcoming event.

SUMMARY OF THE INVENTION

The present invention provides a method for managing the use of one or more peripherals with a mobile wireless communication device in connection with an upcoming event. The method includes associating one or more peripherals with one or more users, where the one or more peripherals have an extended capability for use with a mobile wireless communication device, and maintaining a list of the peripheral associations and the respective extended capabilities. Upcoming events and any need for corresponding event supporting capabilities are monitored. Any unmet need for event supporting capabilities is compared with the extended capability of peripherals associated with at least some of the one or more users that will be attending the upcoming event. An indication is provided to at least one of the users that will be attending the upcoming event having an associated peripheral that will address the unmet need for event supporting capabilities of a request to bring the associated peripheral of the at least one of the users to the upcoming event for providing the associated extended capability for use with a mobile wireless communication device.

In at least some instances, any unmet need for event supporting capabilities is determined by comparing the event supporting capability needs with capabilities supported by the scheduled location of the upcoming event, and/or any unmet need for event supporting capabilities is determined by comparing the event supporting capability needs with native capabilities of the mobile wireless communication devices associated with the at least some of the one or more users that will be attending the upcoming event.

In at least some further instances, the one or more peripherals are adapted for providing current status information relative to the peripheral. The status information can include providing current location information for itself, and wherein providing an indication to at least one of the users includes providing a reminder to bring the peripheral with them as the user associated with the one or more peripherals transitions from a location where the peripheral is located to a location coinciding with the upcoming event.

The present invention further provides a mobile wireless communication device associated with a user and having one or more associated selectively coupleable peripherals, which can be used to augment the capabilities of the mobile wireless communication device. The mobile wireless communication device includes an input/output interface module, which has a wireless transceiver adapted for communicating with one or more other wireless communication devices, and a user interface adapted for conveying information between the mobile wireless communication device and one or more people including the user, wherein the input/output interface module further has one or more selectively coupleable peripherals, which can be selectively included as part of the mobile wireless communication device to provide augmented capabilities. The mobile wireless communication device further includes data storage module adapted for storing a list of upcoming events, and a list of peripheral associations, where the list of peripheral associations include associations between the one or more peripherals and one or more mobile wireless communication device users, and an identification of corresponding extended capabilities affiliated with each of the peripherals. The mobile wireless communication device still further includes a peripheral management controller for managing the use of one or more peripherals with a wireless communication device in connection with an upcoming event. The peripheral management controller having a peripheral association module adapted for managing the list of peripheral associations, and the identification of corresponding extended capabilities affiliated with each of the peripherals.

The peripheral management controller further having an upcoming event monitor module adapted for identifying an upcoming event and determining support capabilities needed in connection with the event. The peripheral management controller still further having an extended capability need determination module adapted for comparing any unmet need for event supporting capabilities with the extended capability of peripherals associated with at least some of the one or more users that will be attending the upcoming event. Still further, the mobile wireless communication device includes a user indication module adapted for providing to at least one of the users that will be attending the upcoming event having an associated peripheral that will address the unmet need for event supporting capabilities of a request to bring the associated peripheral of the at least one of the users to the upcoming event.

The present invention still further provides a network for managing the use of one or more peripherals with one or more mobile wireless communication devices in connection with an upcoming event. The network includes a plurality of mobile wireless communication devices, each mobile wireless communication devices being associated with a user and having one or more associated selectively coupleable peripherals, which can be used to augment the capabilities of the mobile wireless communication device. The network further includes one or more servers. The network still further includes one or more controllers included as part of the plurality of mobile wireless communication devices, the one or more associated selectively coupleable peripherals, and the one or more servers. Together, the one or more servers are adapted for associating one or more peripherals with one or more users, where the one or more peripherals have an extended capability for use with a mobile wireless communication device, and maintaining a list of the peripheral associations and the respective extended capabilities. The one or more servers are further adapted for monitoring upcoming events and any need for corresponding event supporting capabilities, and comparing any unmet need for event supporting capabilities with the extended capability of peripherals associated with at least some of the one or more users that will be attending the upcoming event. The one or more servers are still further adapted for providing an indication to at least one of the users that will be attending the upcoming event having an associated peripheral that will address the unmet need for event supporting capabilities of a request to bring the associated peripheral of the at least one of the users to the upcoming event for providing the associated extended capability for use with a mobile wireless communication device.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

Figure 1:
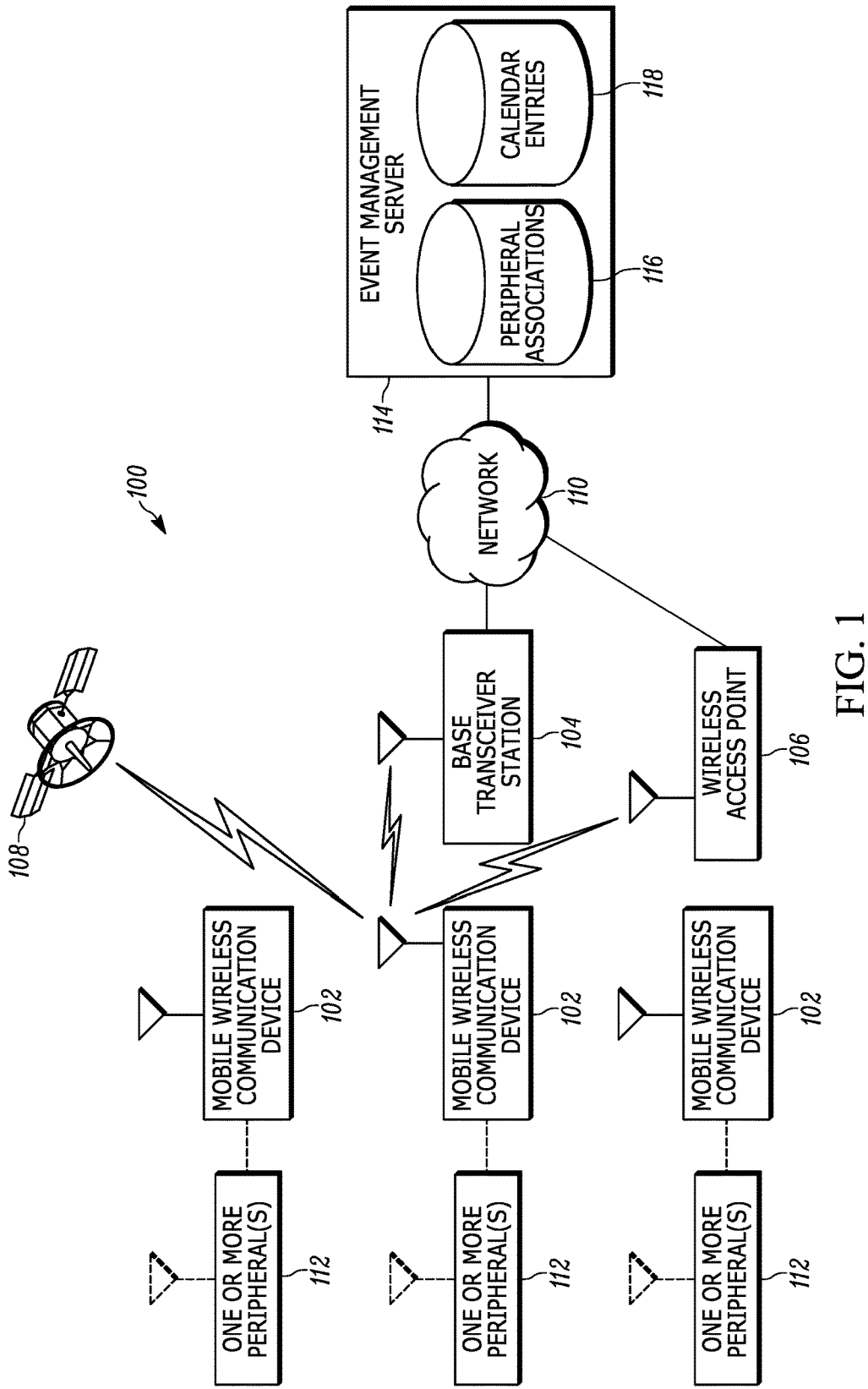
FIG. 1 is a block diagram of an exemplary network environment in which the present invention is adapted to operate.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram of an exemplary communication network environment 100 including one or more mobile wireless communication devices 102, which generally can communicate within the network environment 100. The mobile wireless communication devices 102 can be any suitable communication device, which is capable of movement relative to one or more locations. As the mobile wireless communication devices 102 move relative to one or more locations, the devices will generally attempt to establish and maintain a connection with the network 110. For example, the mobile devices 102 can establish and maintain a wireless communication connection with the network 110 via one or more base transceiver stations 104, which can be arranged to provide wireless communication coverage associated with respective cellular regions, some of which may at least partially overlap. In at least some instances, a connection to the network 110 can be alternatively and/or additionally established and maintained through one or more wireless access points 106, which could provide network access within transmission range of the respective wireless access points 106. The network environment 100 can additionally include one or more satellites 108, which in some instances can be used to provide a reference location. In some instances, it is possible that a satellite can be used to facilitate a wireless communication connection with the network 110.

In the illustrated embodiment, each mobile wireless communication device 102 can be selectively coupled to one or more peripherals 112, which can be used to extend or enhance the functionality of the respective mobile wireless communication device 102 to which it is selectively attached, either directly or indirectly. Still further, the network 110 can be coupled to other devices, such as one or more servers, which could be used to manage desired functionality and/or services relative to the network environment and the devices included as part of and/or coupled to the network. In the illustrated embodiment, the network 110 is coupled to an event management server 114, which is adapted to manage the use of one or more peripherals with a mobile wireless communication device in connection with an upcoming event, and which in support thereof includes peripheral associations 116 and calendar entries 118.

In at least one embodiment of the present invention the event management server 114 is coupled to the network 110. However, in some instances, all or parts of the event management server can be incorporated within other elements, including other network elements, such as the one or more mobile wireless communication devices 102, as well as the one or more peripherals 112. While in FIG. 1, the base transceiver station 104, wireless access point 106 and event management server 114 are illustrated separate from the network 110, in at least some instances, these elements are understood to be part of the network 110 and/or the network infrastructure.

In at least some embodiments, the one or more mobile wireless communication devices 102 can each be a radio telephone, such as a cellular telephone, which can wirelessly communicate with a network 110 via the base transceiver station(s) 104, wireless access point(s) 106, or other type of wireless transceiver, which is communicatively coupled to the network 110. However one skilled in the art will appreciate that different ones of the mobile wireless communication devices 102 could alternatively be representative of other types of devices, such as a personal digital assistant (PDA), a cordless telephone, a tablet, a netbook, a laptop or portable computer, a selective call receiver, a gaming device, a digital music storage and/or playback device, as well as any other form of mobile wireless communication device that might benefit from a communication connection within a network environment 100.

Within the network environment 100, the network 110 can include various public, private and personal networks, packet data and/or circuit switched networks, as well as various wide-area and local-area networks. The various communication connections between the different devices and/or network elements can additionally involve one or more different communication standards. At least a couple of examples of different communication standards include Global System for Mobile Communications (GSM) Code Division Multiple Access (CDMA), Orthogonal Frequency Division Multiple Access (OFDMA), Long Term Evolution (LTE), Global Positioning System (GPS), Bluetooth®, Wi-Fi (IEEE 802.11), Near Field Communication (NFC), Internet/Intranet (TCP/IP), Internet of Things (IOT), as well as various other communication standards. In addition, the mobile wireless communication device 102 may utilize a number of additional various forms of communication including systems and protocols that support a communication diversity scheme, as well as carrier aggregation and simultaneous voice and data signal propagation. For example, base transceiver stations 104 will often be used to support communications within a more public wide-area cellular network environment, where wireless access points 106 are at least sometimes associated with a more private local area network. Satellites 108 can sometimes be used to provide a reference location in support of a global positioning system via which a device might be able to determine a current location. A location may also be determined and/or inferred, in connection with being within current communication range of a particular base transceiver station 104 and/or a wireless access point 106 for which a location is known.

In some instances, a peripheral 112, independent of the mobile wireless communication device 102, may be able to communicate within the network environment 100, as well as independently determine its location. In some of these instances, the peripheral 112 may be able to separately communicate wirelessly, where the peripheral 112 could have its own antenna, which could be coupled to its own transceiver, as well as in turn might separately support one or more communication standards. Examples of communication standards that a peripheral might separately support include Wi-Fi (IEEE 802.11), Bluetooth Low Energy (BLE), Near Field Communication (NFC). Support within the peripheral 112 for still other communication standards could be possible and/or suitable.

Figure 2:
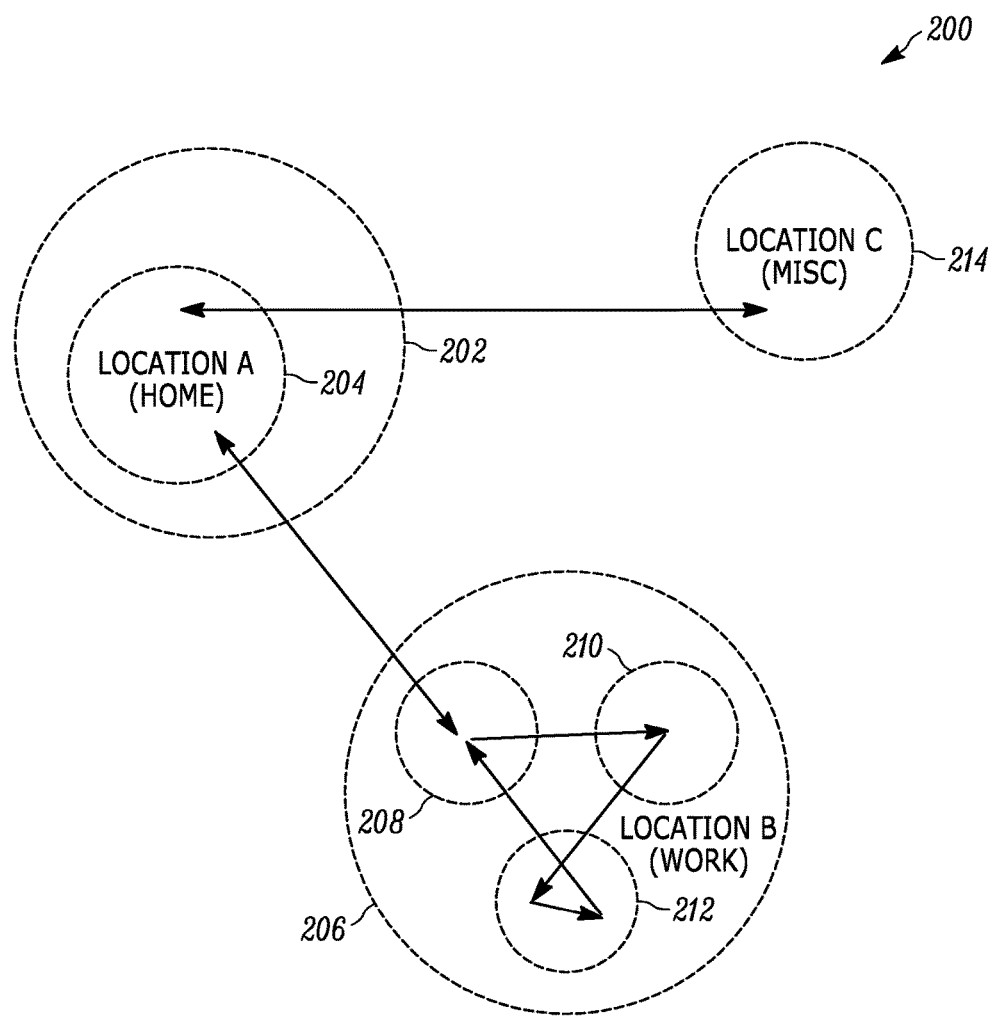
FIG. 2 is a graphical representation of exemplary user movement between multiple locations.

FIG. 2 illustrates a graphical representation 200 of exemplary user movement between multiple locations. As a mobile wireless communication device 102 moves between different locations, it will move between the coverage areas of different wireless transceivers. For example, at location A, which may correspond to a user's home, the location may reside within a first coverage area 202, which coincides with the coverage area of a particular base transceiver station providing cellular communication coverage, as well as another overlapping coverage area 204, which coincides with the coverage area of a particular wireless access point supporting a wireless local area network (WLAN). Even if a mobile wireless communication device 102 is unable to otherwise identify its current location, by recognizing which ones of the base transceiver stations 104 and/or wireless access points 106 are currently within transmission range of the communication device 102, an approximation of location can sometimes be determined.

Further locations, each potentially associated with a different set of coverage areas are also possible. For example, in the illustrated embodiment, a location B, which may correspond to a place of work, is associated with one larger coverage area 206, as well as three smaller coverage areas 208, 210 and 212. In some instances, the three smaller coverage areas can help to determine and distinguish between multiple sub-locations associated with a particular location, such as the user's office, cubicle or desk, as well as other sub-locations, such as a parking lot, a cafeteria, and/or one or more conference rooms. Other network interactions can help to still further distinguish between multiple potentially distinguishable locations. For example, a Bluetooth® connection between a mobile wireless communication device and a docked personal computer can serve to further identify a device's presence at a particular location. As a further example, an NFC interaction in support of a payment transaction, could also be used to help define a device's current location relative to a payment terminal. Still further, in the illustrated embodiment, a third location is associated with a still further coverage area 214.

By tracking a device's movement between locations, it may be possible to track the progress of the user throughout any given day as they move between one or more scheduled and unscheduled events. To the extent that upcoming events, as well as the nature of the event, are known in advance, and event supporting capabilities can be anticipated, it may be possible to predict when the extended capabilities of a peripheral may be desirable. In such an instance, an indication or notification can be provided to an event participant, requesting that they bring their peripheral which has event supporting capabilities to the event. Still further notifications can remind the user of the need to bring their peripheral as they move between various locations during the course of the day. The timing of the reminders can be important, as there may be certain location shifts that may be more difficult to back track or undo, where if a peripheral is forgotten it may be more difficult to recover. For example, people generally transition from home to work only once per day. If a peripheral, which is requested for an event at work, is initially at one's home, it would be helpful for the user to remember to bring the peripheral when they are leaving for work in the morning, even though the upcoming event where the peripheral is wanted and/or needed is scheduled for later in the afternoon.

Figure 3:
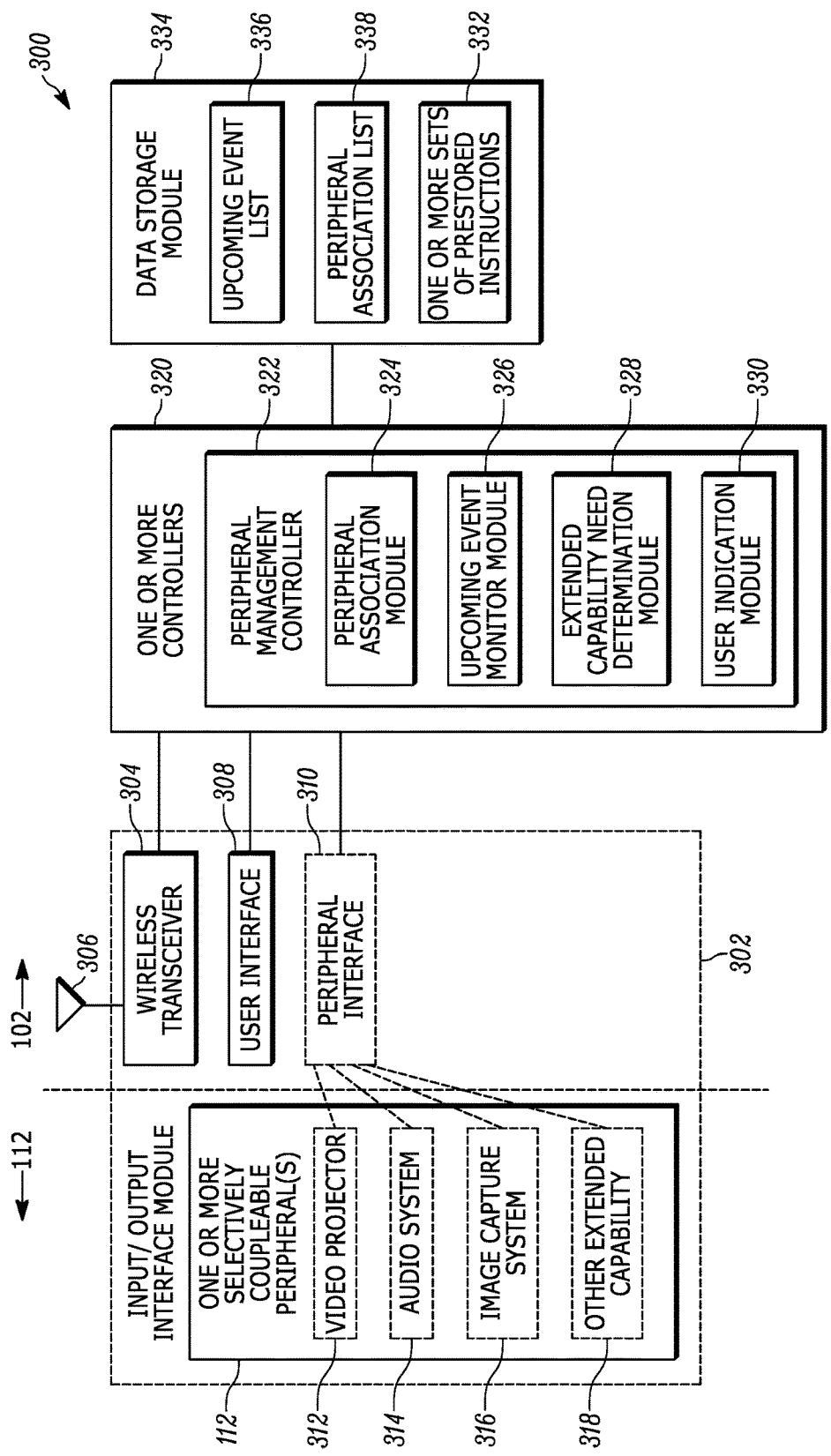
FIG. 3 is a block diagram of a mobile wireless communication device and one or more peripherals, in accordance with at least one embodiment.

FIG. 3 illustrates a block diagram 300 of a mobile wireless communication device 102 and one or more peripherals 112, in accordance with at least one embodiment. The mobile wireless communication device 102 includes an input/output interface module 302, which can extend to include one or more peripherals 112, when selectively coupled thereto. In the illustrated example, the input/output interface module 302 includes a wireless transceiver section 304, which is adapted to communicatively interface with other network 110 elements via a wireless communication connection. In at least some instances, the signals being radiated and/or received are conveyed through a conductor, such as an antenna 306, which serves as an interface between electrical signals and electromagnetic waves.

The wireless transceiver section 304 in at least some instances can include transmitter and receiver circuitry, that could be implemented as part of the transceiver, which could additionally include tuning circuitry for adjusting the frequency upon which a data and/or communication signal is being communicated, as well as encoding/decoding circuitry for formatting the data to be transmitted and/or converting the received data. While in some instances most of the related functionality is integrated as part of the wireless transceiver section, it is also possible that at least some of the noted functionality could be managed under the control of one or more separate controllers 320.

The input/output interface module 302 additionally includes a user interface section 308, which is adapted to receive and convey information between the device and the user of the device. In at least some instances, the user interface section 308 can include various displays, switches, speakers, microphones, transducers and sensors, through which a user can interact with the device. In some instances, an element of the device can include multiple functions. For example a display could additionally incorporate a touch sensitive interface, so as to allow both the transmission and receipt of information relative to the user. In still other instances, an element such as a transducer, could be used to produce a sound which can be audibly detected, as well as a vibration, that can be felt through the user's contact with the device. One skilled in the art will appreciate that the user interface section can incorporate and support various types of user interactions without departing from the teachings of the present application. However, generally developers will make a decision regarding the included native capabilities, recognizing that and further enhancement in the included capabilities will come with certain tradeoffs including tradeoffs related to manufacturing costs, overall device size/weight, rate of power consumption, etc. Based upon the developers decisions, the mobile wireless communication device 102 including the user interface section 308 will support a certain native base line capability which the developers believe will best support the target audience and their general use experiences.

However the inclusion of a certain baseline level of native capabilities, does not preclude the possibility that it may be desirable, that the nature and type of capabilities of the device 102 could be further extended, such as through the selective coupling of one or more peripherals 112. For example, it is envisioned that the capabilities could be extended through one or more peripherals that could feature a video projector capability 312, an enhancement of the audio capabilities 314, an enhancement of the image capture capabilities 316, and/or other extended capabilities 318. In at least some instances, the peripheral could be coupled through a peripheral interface 310, which in some instances could be through a surface connector including a predetermined pattern of conductive pads on a mating surface of the mobile wireless communication device 102 for receiving respective conductors of a peripheral 112 arranged in a corresponding pattern. In other instances, a peripheral interface 310 could include an existing connector port, such as a universal serial bus (USB) port or a headphone jack.

The mobile wireless communication device 102 further includes one or more controllers 320, which are adapted to manage at least some of the operation of the mobile wireless communication device 102. In the illustrated embodiment, the one or more controllers 320 includes a peripheral management controller 322, which can include a peripheral association module 324, an upcoming event monitor module 326, an extended capability need determination module 328, and a user indication module 330. Each of these modules can be implemented in various combinations of hardware and/or software using one or more of discrete logic elements, state machines, gate arrays, processors, firmware, as well as one or more sets of pre-stored instructions 332 stored in a data storage module 334 to be executed by the one or more controllers 320. The data storage module 334 additionally includes an upcoming event list 336 and a peripheral association list 338. While the data storage module 334, is illustrated as being separate from the one or more controllers 320, it is possible that the one or more controllers 320 could have integrated data storage, which could be used to store all or some of the elements, which are presently being shown as being included as part of the separate data storage module 334.

The peripheral management controller 322 is adapted for managing the use of one or more peripherals 112 with a mobile wireless communication device 102 in connection with an upcoming event. The peripheral association module 324 is adapted to manage a peripheral association list 338, or in other words, a list of peripherals 112 that are owned by a particular user and associate them with a corresponding mobile wireless communication device 102. In connection with managing the peripherals relative to a particular event, a current peripheral association list 338 might only include the peripherals 112 associated with the particular individuals that have accepted an invitation to a particular calendar event. In some of the same or other instances, the peripheral association list 338 may be managed and maintained separate from any particular event. In other instances, a corresponding list 338 can be created and maintained in connection with the particular event. In such an instance, an acceptance to a calendar event invitation, such as a meeting request, could include a list of available peripherals 112 for use with the mobile wireless communication device 102 of the accepting user along with the peripherals' associated extended capabilities. The acceptance could also include a list of the base line capabilities of the accepting user's mobile wireless communication device 102. It is also possible that upon acceptance, the mobile wireless communication device 102 could query a central repository, like a network server 114, that might maintain a more global list 338 of user/peripheral associations. Where the list 338 is being maintained in a particular mobile wireless communication device 102, the list 338 may be more likely to be managed relative to a particular event, where the list 338 of associated peripherals is more closely linked to the anticipated participants of a particular event. Where the list 338 is being maintained in a network server 114, it is more likely that a global list 338 may be being maintained, which is independent of a particular event.

The upcoming event monitor module 326 is adapted to manage a list 336 of upcoming events. In some instances, the list 336 of upcoming events will be determined from an application having a calendar type function upon which upcoming events can be organized or stored. Such an application can include events that have been entered by the user, and/or events for which invitations from other users have been received and accepted. The application may also anticipate the occurrence of repeating events, where a known past history can be used to predict the future occurrence of similar likely repeatable type events, based upon a detected pattern. In such an instance, the application may prompt the user for a confirmation for each predicted event, or may get pre-authorization to schedule a reoccurring event, where only the exceptions might be noted.

The upcoming event monitor module 326 can additionally identify event supporting capabilities that might be needed, based upon what is known about the upcoming event. For example, by comparing the event supporting capability needs with capabilities supported by the scheduled location of the upcoming event, an unmet need for event supporting capabilities can be determined. As a further example, by comparing the event supporting capability needs with native capabilities of the mobile wireless communication devices associated with the at least some of the one or more users that will be attending the upcoming event, an unmet need for event supporting capabilities may also be determined. Event supporting capability needs can be determined by looking to past needs for similar prior events. For example, returning to a previously visited location can often involve a repeat of one or more similar activities. In some instances, a description of an upcoming event can also provide clues as to the nature and needs of an upcoming event. The system could parse a description field and look for certain keywords in order to give a hint as to potential event supporting capability needs. Still further, if the event invitation includes an attachment, the type of attachment and/or the attachment's content may also offer a clue. For example, an event organizer might include a meeting agenda, and/or a possible presentation. If a presentation is included, dependent upon the number of participants, it may be helpful to be able to better project various visual or audio aspects of the presentation, in order that all the participants can better view or hear different portions of the presentation.

The extended capability need determination module 328 is adapted to compare any unmet need for event supporting capabilities with the extended capabilities of the peripherals associated with at least some of the one or more users that will be attending the upcoming event, where upon identifying a particular peripheral 112 associated with a particular user, it may be helpful to then provide to the particular user a request from the user indication module 330 to bring the associated peripheral to the upcoming event. Where multiple peripherals 112 have the potential to address the unmet need for event supporting capabilities, the peripheral management controller 322 can prioritize between the multiple peripherals including the particular individual for which a request to bring a peripheral 112 is being made. For example, the peripheral management controller 322 might prioritize peripherals associated with an event organizer. Further, the peripheral management controller 322 might look to the capabilities of the available peripherals 112, when prioritizing between the multiple available peripherals 112.

In connection with providing an indication to a user, the peripheral management controller 322 might provide a reminder to the user as the user is about to transitions between locations including the present location of a peripheral, and the location of an upcoming event. However, if the controller 322 can determine that the user has already remembered to bring the peripheral, it may be possible for the controller 322 to suppress the planned transmission of any corresponding reminder. In some instances recent detected movement or other status information about a peripheral might suggest that the user has already remembered about the request to bring the peripheral 112 to the upcoming event. Recent movement by the peripheral 112 can sometimes be detected, where the peripheral has an ability to monitor its location, such as through the readings that might be associated with one or more sensors. The peripheral could then convey the related information to the one or more controllers 320, which are managing the use of one or more peripherals 112 in connection with the upcoming event.

Figure 4:
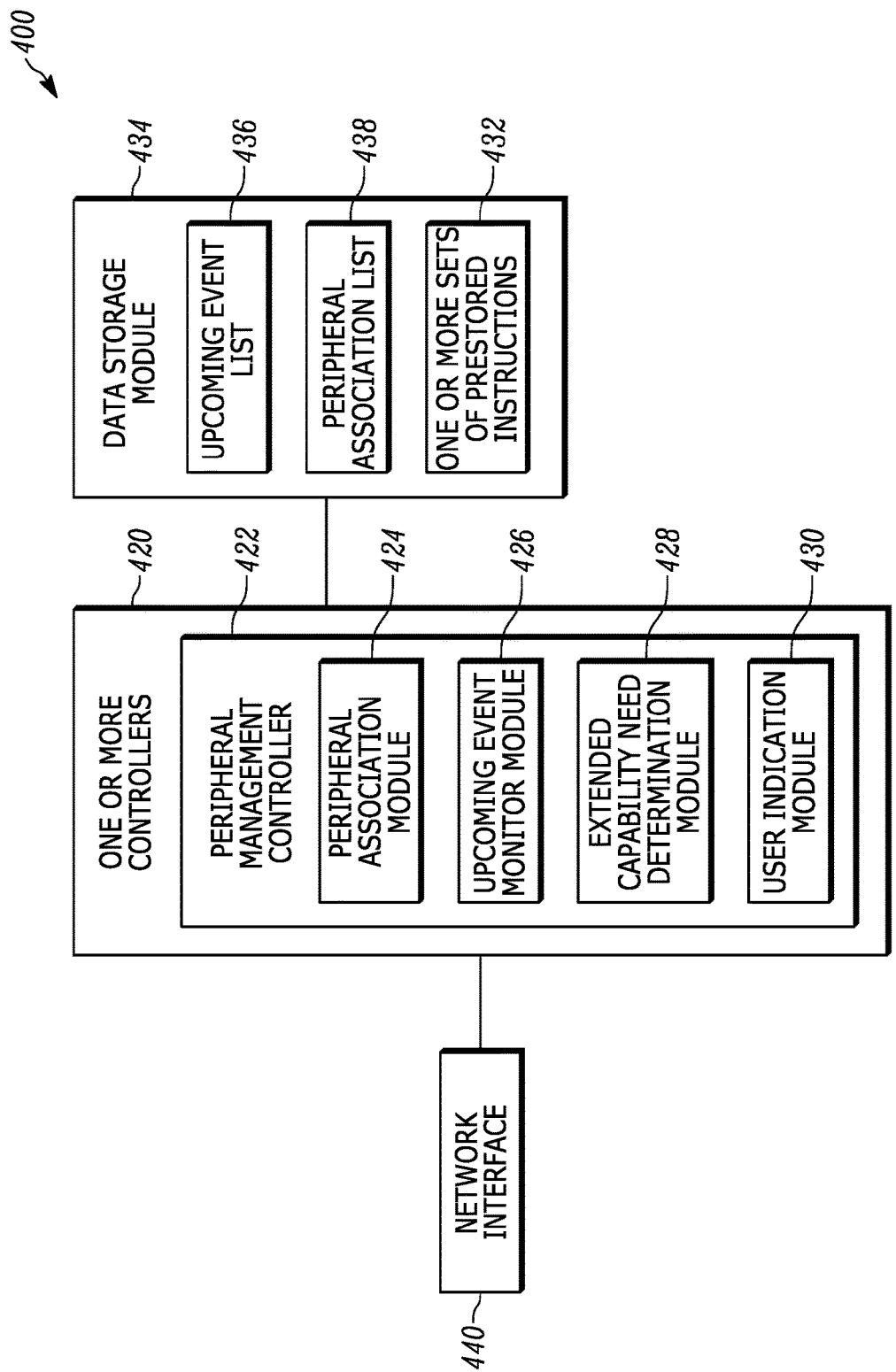
FIG. 4 is a block diagram of an event management server, in accordance with at least one embodiment.

FIG. 4 illustrates a block diagram 400 of an exemplary event management server 114, in accordance with at least one embodiment. In the illustrated embodiment, the event management server similarly has one or more controllers 420, which could similarly include a peripheral management controller 422. Still further, the peripheral management controller includes a peripheral association module 424, an upcoming event monitor module 426, an extended capability need determination module 428, and a user indication module 430.

Similar to the modules of the one or more controllers 320, illustrated in FIG. 3, in connection with the mobile wireless communication device 102, the modules of the one or more controller 420 associated with the event management server 114 can be implemented in hardware and/or software using one or more of discrete logic elements, state machines, gate arrays, processors, firmware, as well as one or more sets of pre-stored instructions 432 stored in a data storage module 434 to be executed by the one or more controllers 420. In the illustrated embodiment, the data storage module additionally includes an upcoming event list 436 and a peripheral association list 438. The event management server 114 can communicate with the network 110, and indirectly with other elements coupled to and/or forming part of the network 110, via a network interface 440.

While the exemplary embodiment, associated with each of the block diagrams illustrated in FIGS. 3 and 4 provide for the multiple aspects of the peripheral management controller to be generally commonly located, it is possible that the various aspects of the peripheral management controller could be distributed between various ones of the one or more controllers included as part of the plurality of mobile wireless communication devices, the one or more associated selectively coupleable peripherals, and/or the one or more servers.

Figure 5:
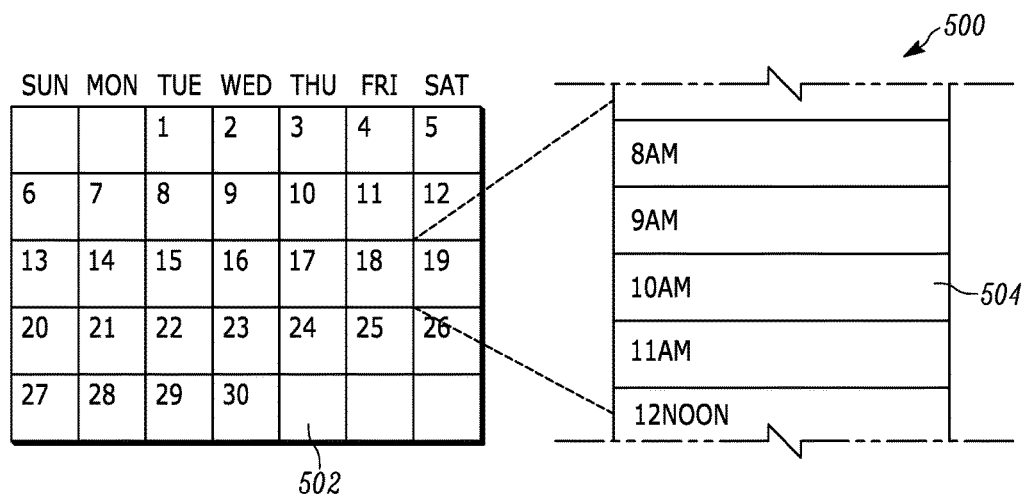
FIG. 5 is an exemplary interface screen, which can be used to enter, access, and/or associate event information with a particular day or time.

FIG. 5 illustrates an exemplary interface screen 500, which can be used to enter, access, and/or associate event information with a particular day or time. In the illustrated embodiment, the interface screen includes a calendar month 502 that can be displayed with the days arranged in rows corresponding to seven days or a week. Each day can be expanded to show various hours 504 in a day, which in turn can be used to identify the anticipated start and ending times of a particular event including an upcoming event during the planning phase, as well as for purposes of reminder after an event invitation has already been accepted.

Figure 6:
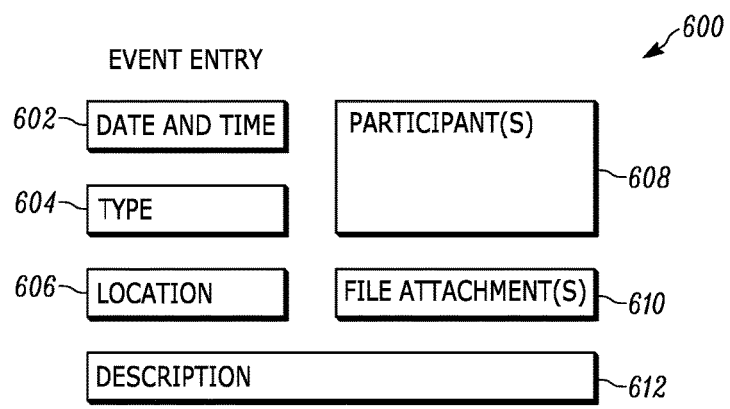
FIG. 6 is an exemplary interface to enter, access and/or update information associated with a particular event.

FIG. 6 illustrates an exemplary interface 600 to enter, access and/or update information associated with a particular event. The particular embodiment illustrated includes a field for storing a scheduled date and time 602, a field 604 which can be used to identify a type of event, and a field 606 for storing a location. A further field 608 can designate the expected participants, either those that have been invited and/or those that have accepted. A still further field 610 can be used to identify one or more file attachment(s). Further yet, the exemplary interface includes a description field 612. Together, the various fields can be used by the system to help determine the need for extended capabilities, that might be met by one or more peripherals, as well as may be used to help plan for and manage requests related to the use of one or more peripherals with a mobile wireless communication device in connection with an upcoming event. For example, a location may have in place facilities that can be used to provide event supporting capabilities, which may be used in place of a peripheral, and therefore having an understanding of what event supporting capabilities are available relative to various event locations can be helpful.

Figure 7:
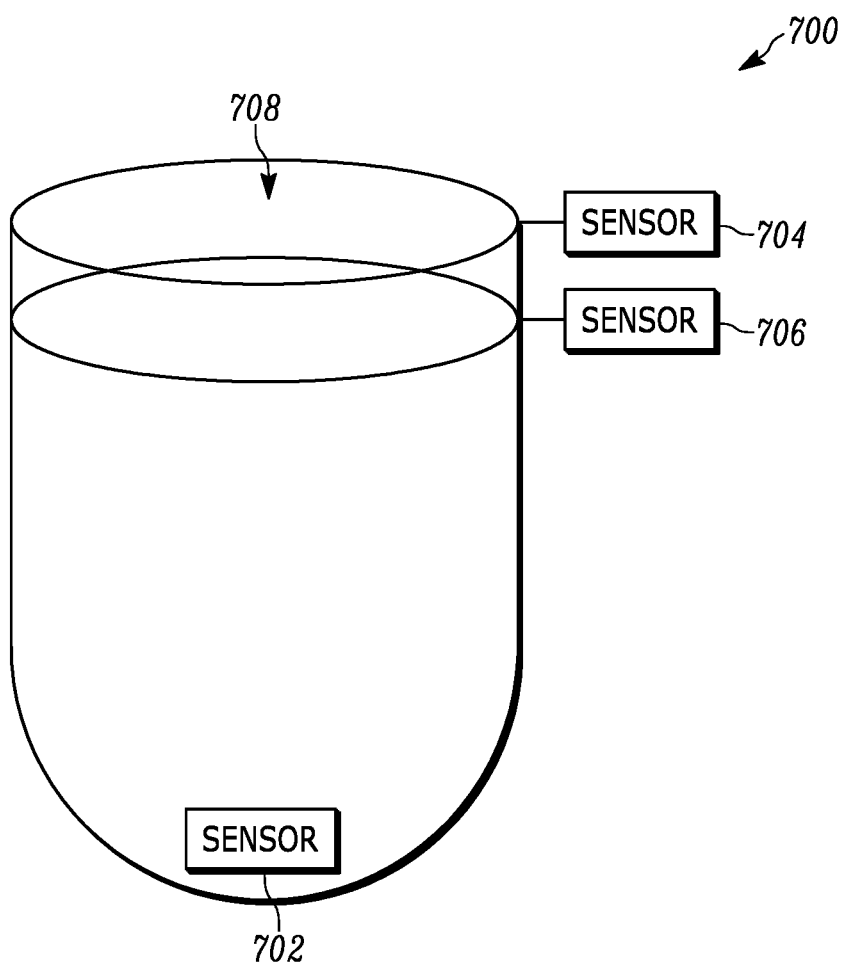
FIG. 7 is a schematic diagram associated with a container or receptacle, such as a bag, for use in receiving other items or objects, and conveying them between multiple locations.

While being able to track the location of a selected peripheral in connection with an upcoming event can help the system better manage the indications that are provided to a user, in some instances the location of a peripheral can be determined in connection with another item such as a bag, a pouch, a purse, a briefcase, or a back pack that one might regularly use to carry items between various locations. FIG. 7 illustrates a schematic diagram associated with a container or receptacle, such as a bag 700, for use in receiving other items or objects, as well as conveying them between multiple locations. For example, the bag can include one or more sensors for detecting the presence of one or more other items. More specifically, in the illustrated embodiment, a sensor 702 at the bottom of a pouch can be used to detect the presence of an item of interest. In such an instance, the sensor might interact with a radio frequency identification (RFID) tag associated with a particular object, which could be used to detect the object's location and/or proximity. Additionally, and/or alternatively, sensors 704 and 706 proximate an opening 708 of the bag 700 could be used to detect an object, which is entering or exiting the bag 700. The order in which the sensors 704 and 706 detect the proximity of the object might be used to determine if the object is entering or exiting the bag 700.

In some instances, the bag 700 may have communication capabilities, which would allow the bag 700 to report the status of its contents to another device including a device or server that might be being used to manage the one or more peripherals relative to a particular event. In other instances, the bag might interface more directly with a mobile wireless communication device, which could use the information and/or convey it to another device, such as a server.

Figure 8:
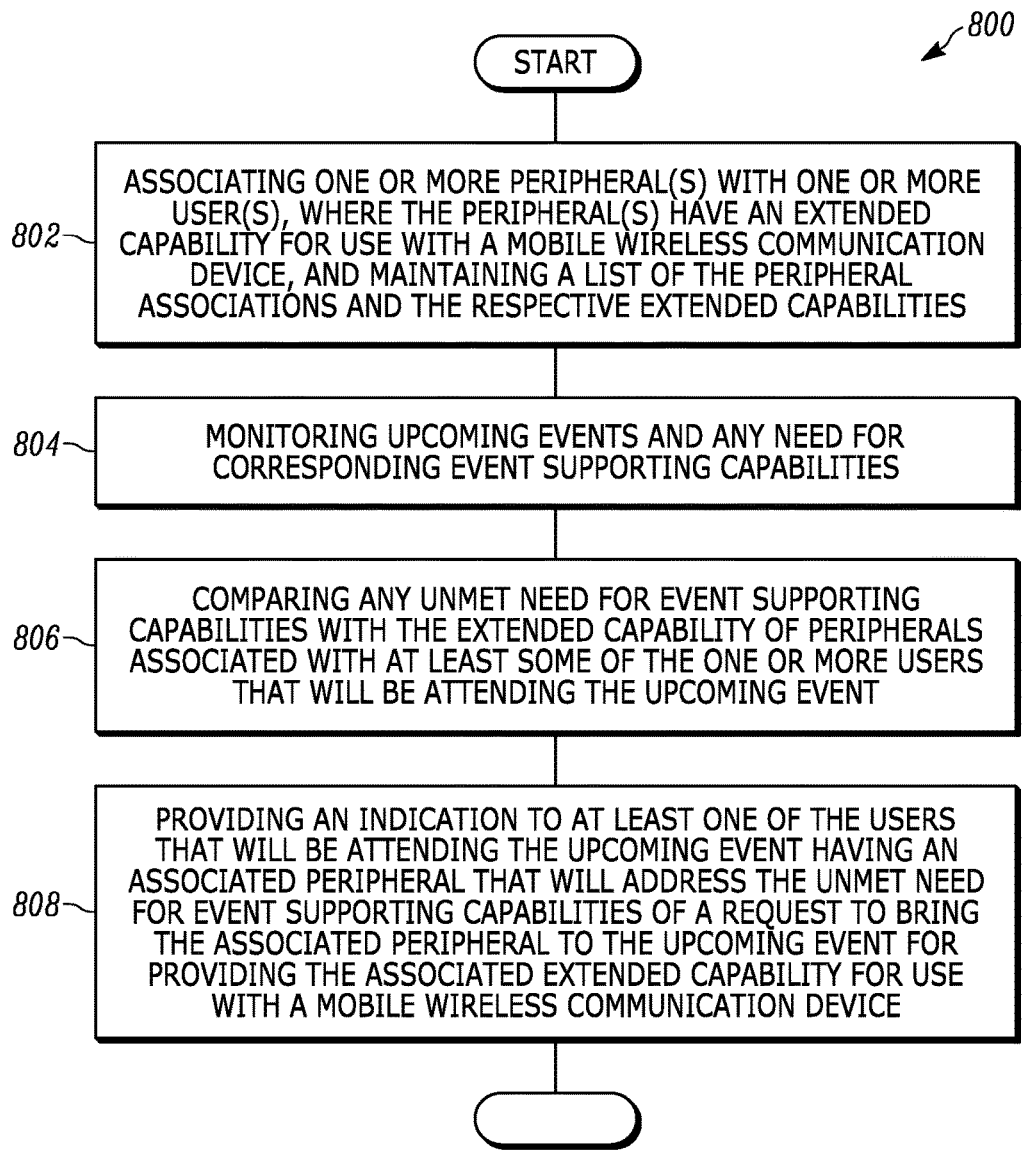
FIG. 8 is a flow diagram of a method for managing the use of one or more peripherals with a mobile wireless communication device in connection with an upcoming event.

FIG. 8 illustrates a flow diagram 800 of a method for managing the use of one or more peripherals with a mobile wireless communication device in connection with an upcoming event. The method includes associating 802 one or more peripherals with one or more users, where the one or more peripherals have an extended capability for use with a mobile wireless communication device, and maintaining a list of the peripheral associations and the respective extended capabilities. Upcoming events and any need for corresponding event supporting capabilities are then monitored 804. Any unmet need for event supporting capabilities are then compared 806 with the extended capability of peripherals associated with at least some of the one or more users that will be attending the upcoming event. An indication is then provided 808 to at least one of the users that will be attending the upcoming event having an associated peripheral that will address the unmet need for event supporting capabilities of a request to bring the associated peripheral of the at least one of the users to the upcoming event for providing the associated extended capability for use with a mobile wireless communication device. In some instances the method is principally performed within a server, or a wireless communication device. However, as noted previously it is possible for different aspects of the method to be performed in different devices including at least potentially in one or more of the related peripherals.

Figure 9:
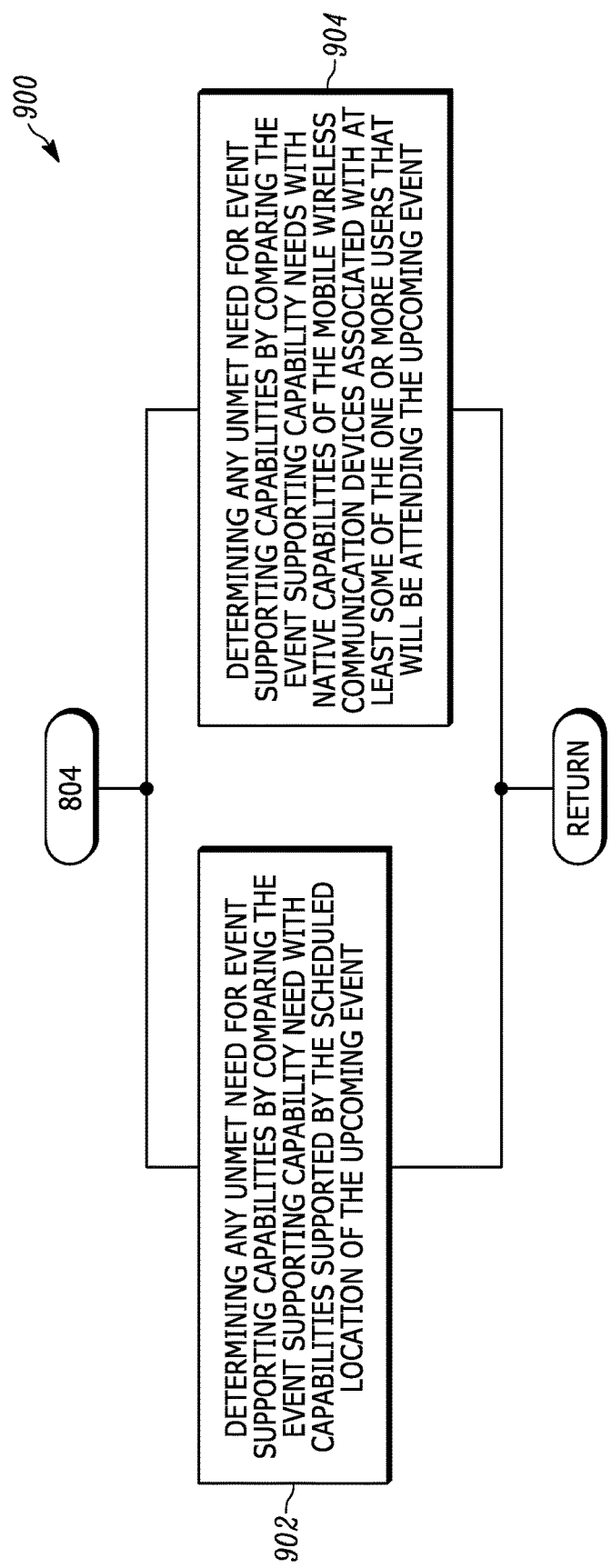
FIG. 9 is a more detailed flow diagram of a method for determining any unmet need for event supporting capabilities.

FIG. 9 illustrates a more detailed flow diagram 900 of a method for determining any unmet need for event supporting capabilities. In at least some instances any unmet need for event supporting capabilities can be determined 902 by comparing the event supporting capability needs with capabilities supported by the scheduled location of the upcoming event. In at least some of the same or other instances any unmet need for event supporting capabilities can be determined 904 by comparing the event supporting capability needs with native capabilities of the mobile wireless communication devices associated with the at least some of the one or more users that will be attending the upcoming event.

Figure 10:
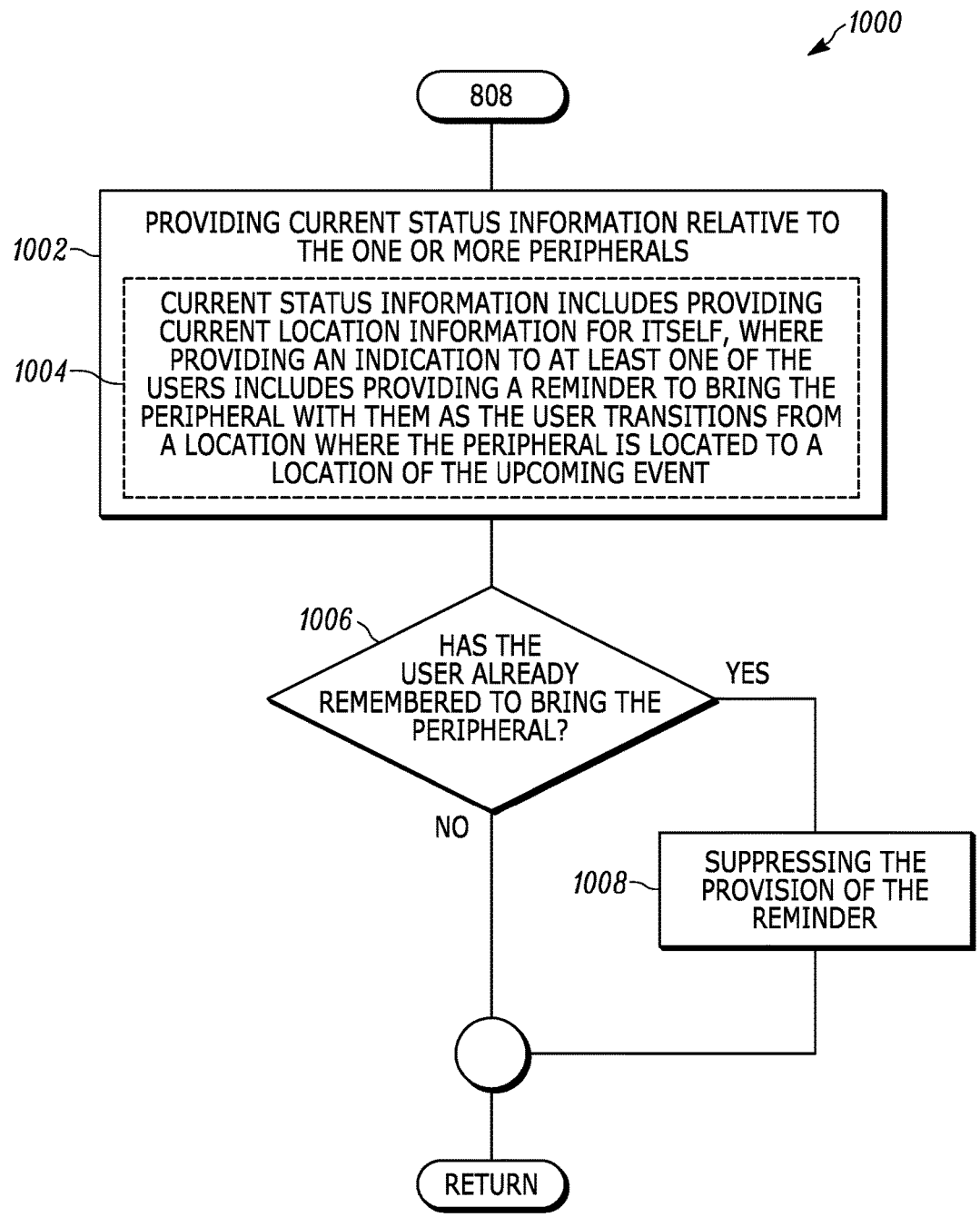
FIG. 10 is a more detailed flow diagram of a method for providing an indication to a user to bring a peripheral to support an unmet need for event supporting capabilities.

FIG. 10 illustrates a more detailed flow diagram 1000 of a method for providing an indication to a user to bring a peripheral to support an unmet need for event supporting capabilities. In at least some instances, current status information relative to the one or more peripherals can be provided 1002. In some of these instances, the current status information being provided by the one or more peripherals can include providing current location information for itself, and where providing an indication to at least one of the users can include providing a reminder to bring the peripheral with them as the user associated with the one or more peripherals transitions from a location where the peripheral is located to a location coinciding with the upcoming event 1004.

In instances where a determination 1006 has been made that the user has already remembered to bring the peripheral as the user prepares to transition toward the location of the upcoming event, providing a reminder to the user to bring the peripheral with them can be suppressed 1008.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for managing the use of one or more peripherals with a mobile wireless communication device in connection with an upcoming event, the method comprising:
associating one or more peripherals with one or more users, where the one or more peripherals have an extended capability for use with a mobile wireless communication device, and maintaining a list of the peripheral associations and the respective extended capabilities;
monitoring upcoming events and any need for corresponding event supporting capabilities;
comparing any unmet need for event supporting capabilities with the extended capability of peripherals associated with at least some of the one or more users that will be attending the upcoming event; and providing an indication to at least one of the users that will be attending the upcoming event having an associated peripheral that will address the unmet need for event supporting capabilities of a request to bring the associated peripheral of the at least one of the users to the upcoming event for providing the associated extended capability for use with a mobile wireless communication device.

2. A method in accordance with claim 1, wherein any unmet need for event supporting capabilities is determined by comparing the event supporting capability needs with capabilities supported by the scheduled location of the upcoming event.

3. A method in accordance with claim 1, wherein any unmet need for event supporting capabilities is determined by comparing the event supporting capability needs with native capabilities of the mobile wireless communication devices associated with the at least some of the one or more users that will be attending the upcoming event.

4. A method in accordance with claim 1, wherein the one or more peripherals are adapted for providing current status information relative to the peripheral.

5. A method in accordance with claim 1, wherein comparing any unmet need for event supporting capabilities with the extended capability of peripherals associated with at least some of the one or more users that will be attending the upcoming event includes prioritizing between multiple peripherals that would satisfy the unmet need for event supporting capabilities.

6. A method in accordance with claim 1, wherein maintaining a list of peripheral associations and the respective extended capabilities includes collecting peripheral information from particular users as part of being included in and accepting an event invitation.

7. A method in accordance with claim 1, wherein the upcoming events includes events determined from a user maintained schedule.

8. A method in accordance with claim 4, wherein the current status information being provided by the one or more peripherals includes providing current location information for itself, and wherein providing an indication to at least one of the users includes providing a reminder to bring the peripheral with them as the user associated with the one or more peripherals transitions from a location where the peripheral is located to a location coinciding with the upcoming event.

9. A method in accordance with claim 8, wherein providing a reminder to the user to bring the peripheral with them is suppressed when a determination has been made that the user has already remembered to bring the peripheral as the user prepares to transition toward the location of the upcoming event.

10. A mobile wireless communication device associated with a user and having one or more associated selectively coupleable peripherals, which can be used to augment the capabilities of the mobile wireless communication device, the mobile wireless communication device comprising:
   an input/output interface module including a wireless transceiver adapted for communicating with one or more other wireless communication devices, and a user interface adapted for conveying information between the mobile wireless communication device and one or more people including the user, wherein the input/output interface module further includes one or more selectively coupleable peripherals, which can be selectively included as part of the mobile wireless communication device to provide augmented capabilities;
   data storage module adapted for storing a list of upcoming events, and a list of peripheral associations, where the list of peripheral associations include associations between the one or more peripherals and one or more mobile wireless communication device users, and an identification of corresponding extended capabilities affiliated with each of the peripherals; and
   a peripheral management controller for managing the use of one or more peripherals with a wireless communication device in connection with an upcoming event, the peripheral management controller including
      a peripheral association module adapted for managing the list of peripheral associations, and the identification of corresponding extended capabilities affiliated with each of the peripherals,
      an upcoming event monitor module adapted for identifying an upcoming event and determining support capabilities needed in connection with the event,
      an extended capability need determination module adapted for comparing any unmet need for event supporting capabilities with the extended capability of peripherals associated with at least some of the one or more users that will be attending the upcoming event, and
      a user indication module adapted for providing to at least one of the users that will be attending the upcoming event having an associated peripheral that will address the unmet need for event supporting capabilities of a request to bring the associated peripheral of the at least one of the users to the upcoming event.

11. A mobile wireless communication device in accordance with claim 10, wherein the upcoming event monitor is further adapted to determine any unmet need for event supporting capabilities by comparing the event supporting capability needs with capabilities supported by the scheduled location of the upcoming event.

12. A mobile wireless communication device in accordance with claim 10, wherein the upcoming event monitor is further adapted to determine any unmet need for event supporting capabilities by comparing the event supporting capability needs with native capabilities of the mobile wireless communication devices associated with the at least some of the one or more users that will be attending the upcoming event.

13. A mobile wireless communication device in accordance with claim 10, wherein at least some of the one or more peripherals include one or more sensors for monitoring the current status of the peripheral, and a wireless transmitter for conveying the status information.

14. A mobile wireless communication device in accordance with claim 10, wherein the user indication module is further adapted to determine whether to send a reminder to at least one of the users to bring an associated peripheral with them to the upcoming event, in response to being the user associated with the one or more peripherals identified as at least partially addressing any unmet need for event supporting capabilities.

15. A mobile wireless communication device in accordance with claim 10, wherein the extended capability need determination module is further adapted to prioritize between multiple peripherals that would satisfy the unmet need for event supporting capabilities.

16. A mobile wireless communication device in accordance with claim 10, wherein the one or more peripherals include a video projector for presenting visual information on an external surface.

17. A mobile wireless communication device in accordance with claim 10, wherein the one or more peripherals include an audio system for projecting audio information.

18. A mobile wireless communication device in accordance with claim 10, wherein the one or more peripherals include an image capture system for receiving external visual information.

19. A mobile wireless communication device in accordance with claim 13, wherein the one or more sensors is adapted for monitoring the current location of the peripheral.

20. A network for managing the use of one or more peripherals with one or more mobile wireless communication devices in connection with an upcoming event, the network comprising:

a plurality of mobile wireless communication devices, each mobile wireless communication devices being associated with a user and having one or more associated selectively coupleable peripherals, which can be used to augment the capabilities of the mobile wireless communication device; and one or more servers;

wherein the network includes one or more controllers included as part of the plurality of mobile wireless communication devices, the one or more associated selectively coupleable peripherals, and the one or more servers, which together are adapted for:

associating one or more peripherals with one or more users, where the one or more peripherals have an extended capability for use with a mobile wireless communication device, and maintaining a list of the peripheral associations and the respective extended capabilities;

monitoring upcoming events and any need for corresponding event supporting capabilities;

comparing any unmet need for event supporting capabilities with the extended capability of peripherals associated with at least some of the one or more users that will be attending the upcoming event; and providing an indication to at least one of the users that will be attending the upcoming event having an associated peripheral that will address the unmet need for event supporting capabilities of a request to bring the associated peripheral of the at least one of the users to the upcoming event for providing the associated extended capability for use with a mobile wireless communication device.

\* \* \* \* \*